United States Patent [19]
Sklar et al.

[11] Patent Number: 5,991,138
[45] Date of Patent: *Nov. 23, 1999

[54] METHOD AND APPARATUS FOR PROTECTING AIRCRAFT ELECTRONICS FROM LIGHTNING

[75] Inventors: Richard Sklar; Ralph Phillipp, both of Huntington Beach; Tracy L. DeCuir, Cypress; Lawrence Girard, Westminister, all of Calif.

[73] Assignee: Rockwell International Corporation, Costa Mesa, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/865,775

[22] Filed: May 30, 1997

[51] Int. Cl.$^6$ ..................................................... H01C 7/12
[52] U.S. Cl. ......................... 361/118; 361/119; 343/705; 359/111; 385/15
[58] Field of Search ........................... 361/117–127, 107, 361/108, 62–66; 359/111, 132; 385/15, 24; 343/705; 341/159, 141

[56] References Cited

U.S. PATENT DOCUMENTS

| | | | |
|---|---|---|---|
| 3,972,045 | 7/1976 | Perret | 343/705 |
| 3,997,894 | 12/1976 | Levine | 341/159 |
| 4,061,577 | 12/1977 | Bell | 359/132 |
| 4,781,427 | 11/1988 | Husbands et al. | 385/24 |

*Primary Examiner*—Michael J. Sherry
*Attorney, Agent, or Firm*—Kyle Eppele; James P. O'Shaughnessy

[57] ABSTRACT

A lightning protection element is incorporated into the portion of an aircraft signal distribution system which connects an antenna to flight critical equipment. The lightning protection element rejects surge currents associated with direct lightning strikes on the antenna, or its surrounding radome, while passing communication signals without significant interference with those signals. In a preferred embodiment, the lightning protection element comprises an optical fiber isolator element. A segment of optical fiber in the isolator prevents surge currents associated with the lightning strikes from reaching the equipment while passing communications signals transmitted on the signal distribution system.

13 Claims, 2 Drawing Sheets

METHOD AND APPARATUS FOR PROTECTING AIRCRAFT ELECTRONICS FROM LIGHTNING

BACKGROUND OF THE INVENTION

1. Field of the Invention

The present invention relates generally to aircraft electrical systems. More particularly, it relates to an improved method and apparatus for protecting aircraft electrical systems from lightning strikes.

2. Description of Related Art

Aircrafts typically include some form of antenna and electronic communication system for receiving and distributing throughout the aircraft, electronic communications such as navigational and air-traffic control information. In addition to traditional aircraft communication systems, the assignee of the present invention has developed aircraft communication systems that allow direct broadcast satellite television signals to be received and distributed on-board an in-flight aircraft. The above-referenced system includes generally an in-flight entertainment system that incorporates a satellite signal receiver station. The in-flight receiver station receives television signals broadcast from a satellite, and the aircraft's signal distribution system distributes the received television programming to passengers. Various aspects of the above-referenced system are disclosed in several co-pending U.S. patent applications, including application Ser. No. 08/667,222, filed Jun. 19, 1996, entitled "Aircraft Satellite Television System for Distributing Television Programming Derived From Direct Broadcast Satellites" having a patent number 5,790,175 application Ser. No. 08/667, 225, filed Jun. 19, 1996, entitled "Distribution Of A Large Number Of Live Television Programs To Individual Passengers In An Aircraft"; now U.S. Pat. No. 5,760,819 and application Ser. No. 08/662,224, filed Jun. 19, 1996, entitled "Distribution Of Satellite Television Programs To Passengers In An Aircraft When It Is Out Of Range Of The Satellites" now U.S. Pat. No. 5,801,751. The entire disclosures of the above-referenced co-pending patent applications are incorporated herein by reference, in their entirety.

Antennas connected to an aircraft, including specifically antennas of the above-referenced communication systems, are typically enclosed in a protective plastic shell housing known generally as a "radome". Radomes are made from a plastic material that protects the antenna from environmental elements while passing the frequencies of the signals being received or transmitted by the antenna. Radomes, however, are susceptible to lightning strikes. A lightning strike hitting the radome could result in damage to equipment within the radome, as well as other downstream equipment connected to the radome-enclosed equipment by wires. In many cases, the downstream equipment is a flight-critical component such as navigational equipment.

One approach to protecting radomes from lightning strikes is to attach lightning protection strips or rods to the radome. The lightning protection strips tend to divert the energy of the lightning strike away from the radome and into the aircraft structure. This approach, however, is not always practical when the equipment enclosed within the radome is a communication antenna because the lightning protection strips tend to degrade the transparency of the radome to the frequencies being received and/or transmitted by the antenna.

Accordingly, there is a need for a method and apparatus that protects radomes and associated equipment from the effects of lightning strikes without degrading antenna performance.

SUMMARY OF THE INVENTION

The present invention is embodied in a method and apparatus for protecting radomes and associated electronics from direct lightning strikes without degrading antenna performance. According to the present invention, a lightning protection element is introduced along the various signal paths connecting the equipment that is to be protected. Preferably, the lightning protection element rejects the surge currents associated with lightning, while allowing signals to pass without significant interference. In a preferred embodiment, the lightning protection element is an optical fiber transmission line that transmits optical signals. Such an optical fiber transmission line will be referred to in this disclosure as an optical isolator. Optical fibers tend to reject the harmful energy associated with lightning, while allowing optical signal energy to pass without significant interference. The invention may be embodied in a primarily optical aircraft communication system wherein either all or a significant portion of the communication system's signals are transmitted via optical fiber. The invention may also be embodied in a hybrid aircraft communication system wherein some portions of the electronic signals are transmitted via hard wire, and other portions of the electronics signals are transmitted via optical fibers. The optical fibers inhibit the harmful energy generated by lightning strikes, while allowing optical signals to pass without significant interference. The optical fiber portions (i.e., optical isolators) may be selectively positioned in the communication system's signal path to maximize the lightning protection features of the fibers while minimizing the optical portions of the communications path.

The invention itself, together with further objects and attendant advantages, will best be understood by reference to the following detailed description, taken in conjunction with the accompanying drawings.

DESCRIPTION OF THE PREFERRED EMBODIMENTS

The present invention is embodied in a method and apparatus for protecting radomes and associated electronics from lightning strikes without degrading antenna performance. According to the present invention, a lightning protection element is introduced into the signal paths connecting the equipment that is to be protected. Preferably, the lightning protection element rejects the harmful energy associated with lightning, while allowing signals to pass without significant interference. In a preferred embodiment, the lightning protection element is an optical fiber transmission line that transmits optical signals. Such an optical fiber transmission line will be referred to in this disclosure as an optical isolator. Optical fibers tend to reject the harmful energy associated with lightning, while allowing optical signal energy to pass without significant interference. The invention may be embodied in a primarily optical aircraft communication system wherein either all or a significant portion of the communication system's signals are transmitted via optical fiber. The invention may also be embodied in a hybrid aircraft communication system wherein some portions of the electronic signals are transmitted via hard wire, and other portions of the electronics signals are transmitted via optical fibers. The optical fibers inhibit the harmful energy generated by lightning strikes, while allowing optical signals to pass without significant interference. The optical fiber portions (i.e., optical isolators) may be selectively positioned in the communication system's signal path to maximize the lightning protection features of the fibers while minimizing the optical portions of the communications path.

Figure 1:
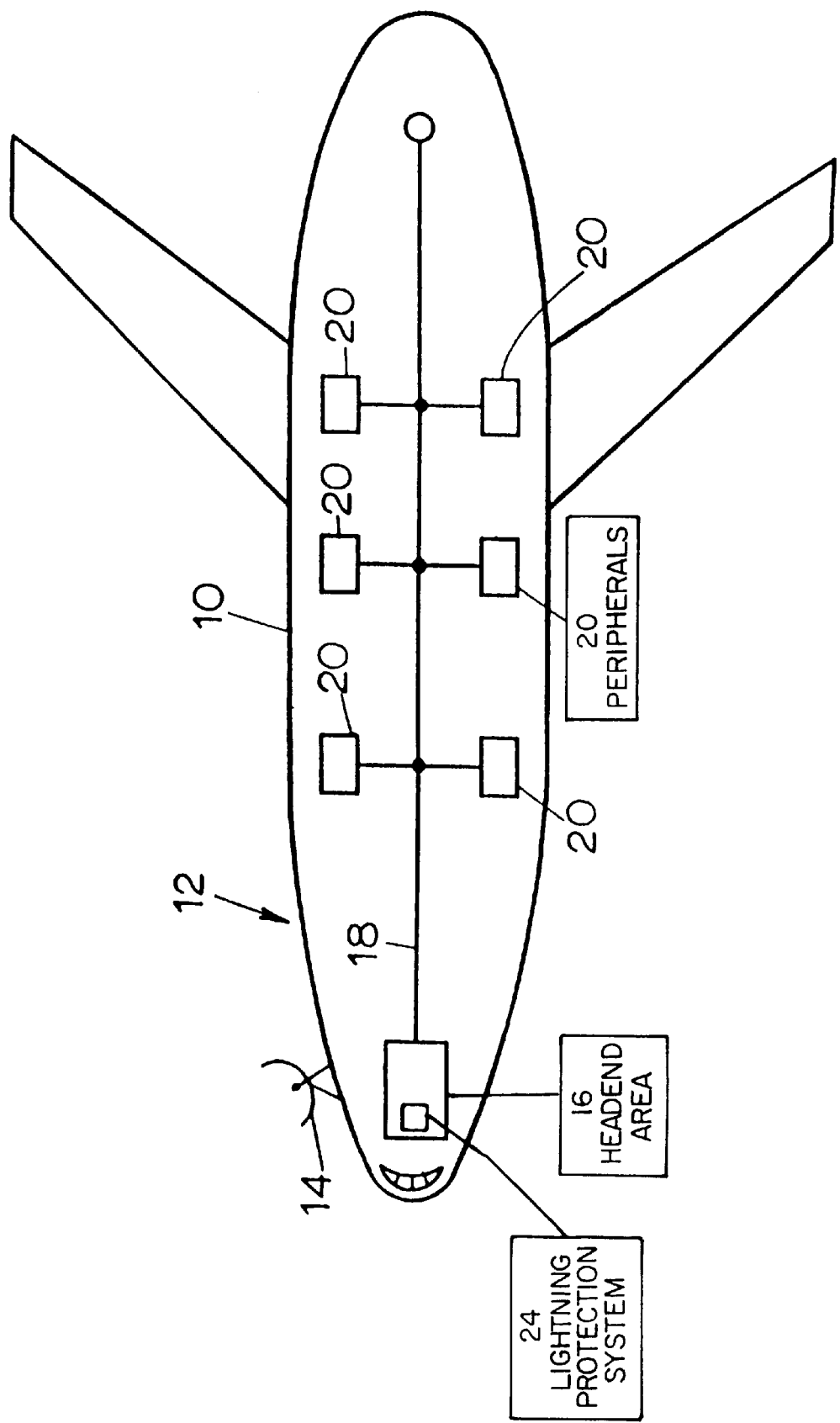
FIG. 1 is a diagram of an aircraft antenna and signal distribution system capable of utilizing the present invention.

Turning now to the figures, and to a more detailed description of the disclosed embodiments, there is illustrated in FIG. 1 a high level diagram of an aircraft reception and signal distribution system 12 capable of utilizing the present invention. As shown in FIG. 1, an aircraft 10 incorporates the aircraft electronic signal distribution system 12. Aircrafts typically include some form of antenna and electronic communication system for receiving and distributing throughout the aircraft, electronic communications such as navigational and air-traffic control information. In addition to traditional aircraft communication systems, the assignee of the present invention has developed aircraft communication systems that allow direct broadcast satellite television signals to be received and distributed on-board an in-flight aircraft. The above-referenced system includes generally an in-flight entertainment system that incorporates a satellite signal receiver station. The in-flight receiver station receives television signals broadcast from a satellite, and the aircraft's signal distribution system distributes the received television programming to passengers. Various aspects of the above-referenced system are disclosed in several co-pending U.S. patent applications, including application Ser. No. 08/667,222, filed Jun. 19, 1996, entitled "Aircraft Satellite Television System for Distributing Television Programming Derived From Direct Broadcast Satellites" having a U.S. Pat. No. 5,790,175; application Ser. No. 08/667,225, filed Jun. 19, 1996, entitled "Distribution Of A Large Number Of Live Television Programs To Individual Passengers In An Aircraft" now U.S. Pat. No. 5,760,819; and application Ser. No. 08/667,224, filed Jun. 19, 1996, entitled "Distribution Of Satellite Television Programs To Passengers In An Aircraft When It Is Out Of Range Of The Satellites" now U.S. Pat. No. 5,801,751. The entire disclosures of the above-referenced co-pending patent applications are incorporated herein by reference, in their entirety.

The aircraft 10 shown in FIG. 1 includes an antenna 14 and signal distribution system 12. The aircraft communication system 12 includes a headend area 16, a signal distribution network 18, and a plurality of peripherals 20 consisting primarily of passenger seat stations or terminals. In general, the headend 16 is located at the front of the aircraft cabin, and provides, inter alia, a central location for the assembly of the entertainment related signals/services that are transmitted to the passenger terminals 20 via the aircraft communication system 12. If the communication signals relate to entertainment services, the aircraft communication system 12 is often referred to as an in-flight entertainment (IFE) system 12. According to the present invention, the head-end 16 incorporates a lightning protection system 24 embodying the present invention.

Figure 2:
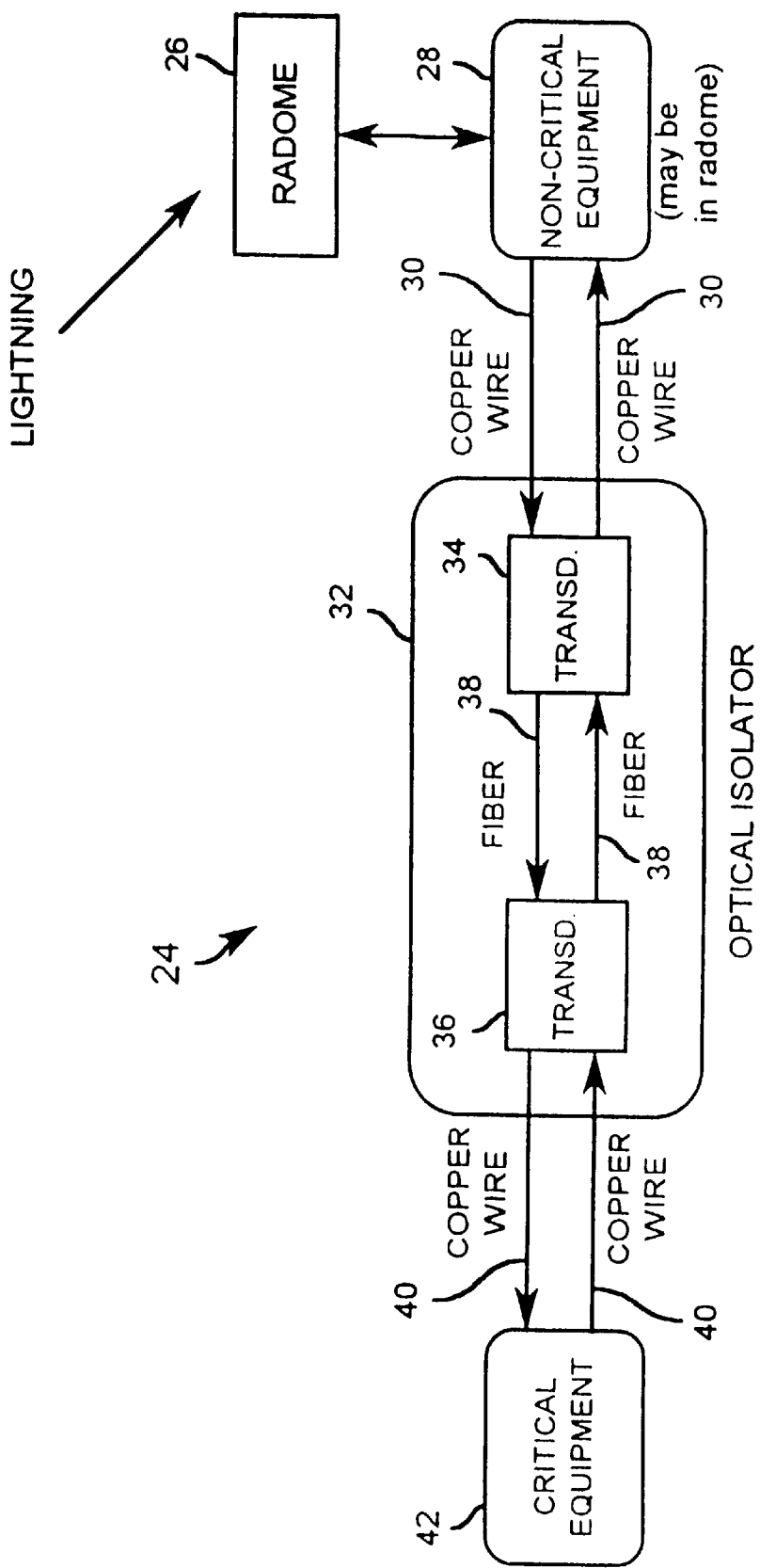
FIG. 2 is a diagram of a portion of the signal distribution system shown in FIG. 1. The system incorporates lightning protection elements and/or optical insulators embodying the present invention.

FIG. 2 illustrates additional details of the lightning protection system 24 shown in FIG. 1 and embodying the present invention. The system 24 includes generally a radome 26 housing an antenna 14 (shown in FIG. 1), non-critical equipment 28, an optical isolator 32, and critical equipment 42. The non-critical equipment 28 is connected to the optical isolator 32 by a first set of copper wires 30, and the critical equipment 42 is connected to the optical isolator 32 by a second set of copper wires 40. The optical isolator 32 includes a first transducer 34 connected to the first set of copper wires 30, and a second transducer 36 connected to the second set of copper wires 40. The first transducer 34 is connected to the second transducer 36 by optical fibers 38.

The embodiment of the present invention shown in FIG. 2, provides lightning protection to aircraft equipment by replacing the wires between the equipment with optical fiber. The illustrated embodiment includes a lightning protection element (optical isolator 32) that rejects the damaging energy created by a lightning strike but continues to pass normal communication signals.

The location of the lightning protection element or optical isolator 32 is not restricted to the location illustrated in FIG. 2. If the equipment 28, 42 is in the radome 26 and communicates with other equipment, the isolator 32 can be located at that interface also. The isolator 32 is shown in FIG. 2 downstream of the antenna/radome 26, between the non-critical equipment 28 and the critical equipment 42, thereby providing protection to the critical equipment 42 at the expense of non-critical equipment 28.

As shown in FIG. 2, the non-critical equipment 28, which may or may not be within the radome 26, is shown to communicate with the critical aircraft equipment 42 over copper wires 30, 40 used for digital data. An optical isolator 32 is placed between the two systems 28, 42 such that the digital communications over copper wires 30 being transmitted by the non-critical equipment 28 is converted by the first transducer 34 to light energy and applied to a length of optical fiber 38. The optical fibers 38 serve to inhibit the large currents which would be caused by a lightning strike from progressing towards the critical equipment 42, and, instead, carries the same digital data which was generated by the non-critical equipment 28 on the copper wires 30.

The optical fibers 38 leaving the first transducer 34 are applied to the second transducer 36 where it is converted back to voltages on a copper wire 40 which is then provided to the critical equipment 42. In this way, the optical isolator 32 is transparent to both the non-critical equipment 28 and the critical equipment 42.

Digital signals transmitted from the critical equipment 42 on copper wires 40 are treated in the same way, with the second transducer 36 converting these signals to light and applying it to a length of fiber 38. This fiber 38 serves to block any large currents originating in the non-critical equipment 28 from being applied to the critical equipment 42. The fiber 38 is then applied to the first transducer 34 where it is converted back to voltages for application to the first copper wires 30. The non-critical equipment 28 then receives this interface output as if it had originated directly from the critical equipment 42.

Of course, it should be understood that a range of changes and modifications can be made to the preferred embodiment described above. For example, the present invention is described in connection with a particular hardware and processing structure for transmitting and receiving digital and/or analog communications on an aircraft. However, a wide variety of transmitting and receiving structures could be utilized as long as the essential lightning strike protection features described herein are present. The radome may be made from any material that passes frequencies of interest to the antenna while at the same time protecting the antenna. It is therefore intended that the foregoing detailed description be regarded as illustrative rather than limiting and that it be understood that it is the following claims, including all equivalents, which are intended to define the scope of this invention.

What is claimed is:

1. A protection system for use in aircraft having an antenna, a radome covering the antenna, first electronic equipment which is critical to aircraft flight and second electronic equipment which is not critical to aircraft flight, the protection system protecting the first electronic equipment from damage caused by direct lightning strikes on the radome and the antenna and comprising:

a first signal distribution system transmitting communication signals from the antenna to the first electronic equipment via an electrically conductive transmission path, the first signal distribution system incorporating at least one optical isolator positioned to break the electrically conductive transmission path to prevent surge currents associated with the direct lightning strikes from reaching the first electronic equipment but pass the communication signals along an optical communication path, said optical communication path being minimized in relation to said electrically conductive transmission path and effective to prevent said surge currents; and a second signal distribution system transmitting communication signals directly from the antenna to the second electronic equipment through an electrically conductive transmission path without passing through any optical isolator.

2. The protection system of claim 1 wherein the second electronic equipment is in the radome.

3. The protection system of claim 1 wherein the first signal distribution system utilizes electrically conductive wires.

4. The protection system of claim 3 wherein the at least one isolator incorporates a segment of optical fiber communication medium and transducers to connect the optical fiber communication medium segment to the electrically conductive wires.

5. The protection system of claim 4 wherein the optical fiber communication medium segment rejects the surge currents associated with the lightning strikes.

6. The protection system of claim 5 wherein the optical fiber communication medium segment passes at least a portion of the communications signals transmitted from the antenna on the first signal distribution system.

7. A method for use in aircraft having an antenna, a radome covering the antenna, first electronic equipment which is critical to aircraft flight and second electronic equipment which is not critical to aircraft flight, the method protecting the first electronic equipment from damage caused by direct lightning strikes on the radome and the antenna and comprising the steps of:

(a) transmitting communication signals from the antenna to the first electronic equipment via an electrically conductive transmission path with a first signal distribution system that incorporates at least one optical isolator positioned to break the electrically conductive transmission path to prevent surge currents associated with the direct lightning strikes from reaching the first electronic equipment and pass the communication signals along an optical communication path, said optical communication path being minimized in relation to said electrically conductive transmission path and effective to prevent said surge currents; and (b) transmitting communication signals directly from the antenna to the second electronic equipment with a second signal distribution system through an electrically conductive transmission path without passing through any optical isolator.

8. The method of claim 7 further comprising the step of providing said second electronic equipment in said radome.

9. The method of claim 7 wherein step (a) comprises the step of:

(a1) transmitting communication signals from said antenna to said first electronic equipment with a first signal distribution system that utilizes electrically conductive wires.

10. The method of claim 9 wherein the at least one isolator incorporates a segment of optical fiber communication medium and transducers to connect the optical fiber communication medium segment to the electrically conductive wires.

11. The method of claim 10 wherein said optical fiber communication medium segment rejects the surge currents associated with the lightning strikes.

12. The method of claim 11 wherein the optical fiber communication medium segment passes at least a portion of the communications signals transmitted from the antenna on the first signal distribution system.

13. A method for use in aircraft having an antenna, a radome covering the antenna, first electronic equipment which is critical to aircraft flight and second electronic equipment which is not critical to aircraft flight, the method protecting the first electronic equipment from damage caused by direct lightning strikes on the radome and the antenna and comprising the steps of:

(a) connecting the antenna to the first electronic equipment with a first signal distribution system using an electrically conductive wire circuit to transmit communication signals from the antenna to the first electronic equipment;

(b) inserting into the electrically conductive wire circuit at least one optical isolator to prevent surge currents associated with the direct lightning strikes from reaching the first electronic equipment and pass the communication signals along an optical communication path, said optical communication path being minimized in relation to said electrically conductive wire circuit and effective to prevent said surge currents; and (c) connecting the antenna to the second electronic equipment with a second signal distribution system using an electrically conductive wire circuit to transmit communication signals directly from the antenna to the second electronic equipment without passing through any optical isolator.

* * * * *